US009509230B2

(12) United States Patent
Abe

(10) Patent No.: US 9,509,230 B2
(45) Date of Patent: Nov. 29, 2016

(54) POWER CONVERSION DEVICE

(75) Inventor: Yasushi Abe, Hino (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 187 days.

(21) Appl. No.: 13/188,859

(22) Filed: Jul. 22, 2011

(65) Prior Publication Data

US 2012/0020137 A1     Jan. 26, 2012

(30) Foreign Application Priority Data

Jul. 22, 2010  (JP) ................................ 2010-164735

(51) Int. Cl.
| H02M 7/537 | (2006.01) |
| H02M 7/487 | (2007.01) |
| H02M 7/538 | (2007.01) |
| H02M 7/06  | (2006.01) |

(52) U.S. Cl.
CPC ............... *H02M 7/487* (2013.01); *H02M 7/06* (2013.01); *H02M 7/537* (2013.01); *H02M 7/538* (2013.01)

(58) Field of Classification Search
CPC .............................. H02M 7/487; H02M 7/537
USPC ........... 363/131, 132, 133, 134, 135, 65, 37, 363/17, 34, 15, 16, 28, 57, 95, 96, 97, 98, 363/136
See application file for complete search history.

(56) References Cited

U.S. PATENT DOCUMENTS 5,260,864 A * 11/1993 Simonelli et al. ............ 363/143
5,959,857 A    9/1999 Nagahara 2002/0034083 A1 * 3/2002 Ayyanar et al. .............. 363/17
2007/0120543 A1 * 5/2007 Caldwell ................ H02M 1/10
                                                                    323/272
2007/0230226 A1 * 10/2007 Lai et al. ...................... 363/65

(Continued)

FOREIGN PATENT DOCUMENTS

| CN | 101409517 A  | 4/2009  |
| CN | 101674028 A  | 3/2010  |
| JP | 04-361872 A  | 12/1992 |

(Continued)

OTHER PUBLICATIONS

Notification of Reason for Refusal issued in corresponding Japanese Patent Application No. 2010-164735, dated Apr. 1, 2014. Partial English Translation provided.

(Continued)

*Primary Examiner* — Jeffrey Gblende
*Assistant Examiner* — Trinh Dang
(74) *Attorney, Agent, or Firm* — Rossi, Kimms & McDowell LLP

(57) ABSTRACT

A single phase three-level power converter can include a first half bridge and a second half bridge. A half bridge operation is implemented in either the first half bridge or second half bridge when outputting a single phase alternating current voltage having an amplitude a half or less than that of a direct current input voltage, and also, by alternately switching between the bridges carrying out the half bridge operation. In certain configurations, the power converter can convert a direct current input voltage into alternating current phase voltages having three levels of potential, which are positive, negative, and intermediate voltages, by controlling on-off conditions of a plurality of switch elements, and a controller that, by supplying gate signals to the switch elements configuring the first half bridge and second half bridge, controls the related on-off conditions.

14 Claims, 6 Drawing Sheets

(56) References Cited

U.S. PATENT DOCUMENTS

2009/0251927 A1* 10/2009 Popescu et al. ............... 363/17
2010/0084922 A1    4/2010 Gollentz et al.

FOREIGN PATENT DOCUMENTS

| | | |
|---|---|---|
| JP | 05251172 A | 9/1993 |
| JP | 09308263 A | 11/1997 |
| JP | 10136653 A | 5/1998 |
| JP | 2002247862 A | 8/2002 |
| JP | 2007-028860 A | 2/2007 |
| JP | 2007028860 A | 2/2007 |
| JP | 2008-178284 A | 7/2008 |
| JP | 2009-140766 A | 6/2009 |

OTHER PUBLICATIONS

Japanese Office Action issued in Japanese counterpart application No. JP2010-164735, dated Nov. 11, 2014. Partial English translation provided.

Chinese Office Action issued in Chinese counterpart CN2014072901277920, dated Aug. 1, 2014. English translation provided.

Decision to Dismiss Amendment issued in JP2010-164735, mailed Jun. 23, 2015. English translation provided.

Decision of Refusal issued in JP2010-164735, mailed Jun. 23, 2015. English translation provided.

* cited by examiner

POWER CONVERSION DEVICE

BACKGROUND OF THE INVENTION

1. Technical Field

The present invention relates to power conversion devices that convert direct current voltage to alternating current voltage, and in particular, to such devices that reduce loss in a single phase three-level power conversion device.

2. Related Art

With a view to reducing waveform distortion in an inverter device that converts direct current power to alternating current power, a three-level inverter type has been proposed (see, for example, Japanese Patent Publication Nos. JP-A-2008-178284 and JP-A-2007-28860). Hereafter, the configurations and actions of circuits disclosed in Japanese Patent Publication Nos. JP-A-2008-178284 and JP-A-2007-28860 will be described with reference to FIGS. 9 to 11 as heretofore known examples of a single phase three-level inverter.

FIG. 9 is a circuit configuration diagram of the single phase three-level inverter disclosed in JP-A-2008-178284. The single phase three-level inverter, with a controller (CN) 6a controlling an on-off condition of switch elements configuring an inverter circuit (IC) 3a, converts a direct current voltage 2E of a power source 1 into a single phase alternating current voltage, and supplies the single phase alternating current voltage to a load 5.

In FIG. 9, a capacitor C1 and capacitor C2 are connected in series to either end of a power source 1. The capacitor C1 and capacitor C2 configure a first direct current power source and second direct current power source. When the voltage of the power source 1 is 2E, the voltages of the capacitor C1 and capacitor C2 are each E. Also, a voltage detector (VD) 2 is connected to both ends of the power source 1, and the voltage 2E of the power source 1 is detected by the voltage detector 2.

Next, a series circuit in which switch elements 1u to 4u are connected in series is connected to both ends of a series circuit formed of the capacitor C1 and capacitor C2. Diodes 1x to 4x are respectively connected in inverse parallel to the switch elements 1u to 4u configuring the series circuit. Also, diodes 5x and 6x are connected in series between the connection point of the switch elements 1u and 2u and the connection point of the switch elements 3u and 4u. Furthermore, the connection point of the diodes 5x and 6x is connected to a connection point of the capacitors C1 and C2.

Also, a series circuit in which switch elements 1v to 4v are connected in series is connected to both ends of the series circuit formed of the capacitor C1 and capacitor C2. Diodes 1y to 4y are respectively connected in inverse parallel to the switch elements 1v to 4v configuring the series circuit. Also, diodes 5y and 6y are connected in series between the connection point of the switch elements 1v and 2v and the connection point of the switch elements 3v and 4v. Furthermore, the connection point of the diodes 5y and 6y is connected to a connection point of the capacitors C1 and C2.

Herein, the switch elements 1u to 4u and diodes 1x to 6x configure a first half bridge. The switch elements 1v to 4v and diodes 1y to 6y configure a second half bridge. Furthermore, the first half bridge and second half bridge configure the inverter circuit 3a.

The connection point of the switch elements 2u and 3u is a U terminal, and the connection point of the switch elements 2v and 3v is a V terminal. The U terminal and V terminal are alternating current output terminals of the inverter circuit 3a. A voltage detector (VD) 4 and the load 5 are connected in parallel between the U terminal and V terminal.

Next, the controller 6a outputs gate signals of the switch elements 1u to 4u and 1v to 4v. In order to do this, the controller 6a includes an output voltage command unit 61, a control computation unit 62, and a first PWM controller 63a.

Hereafter, a description will be given of actions of the controller 6a. Firstly, the output voltage command unit 61 outputs the command value of a voltage to be applied by the inverter circuit 3a to the load.

The control computation unit 62 carries out an AVR computation with a PI regulator, or the like, so that an alternating current output voltage detected by the voltage detector 4 and the output voltage command output by the output voltage command unit 61 match. Furthermore, the control computation unit 62 computes a modulation signal for a PWM control by dividing the result of the AVR computation by a direct current input voltage detected by the voltage detector 2.

The first PWM controller 63a carries out a size comparison of an internally generated carrier signal and the modulation signal output by the control computation unit 62, and generates the gate signals of the switch elements 1u to 4u and 1v to 4v. The gate signals are output to the inverter circuit 3a.

The switch elements 1u to 4u and 1v to 4v are on-off controlled by the gate signals. As a result of this, a desired alternating current voltage is output between the U and V terminals of the inverter circuit 3a.

FIG. 10 is a diagram showing an example of an output voltage waveform generated between the U and V terminals of the inverter circuit 3a shown in FIG. 9. As a single phase three-level inverter generally acts on a carrier frequency in the region of 10 kHz, the output voltage has a waveform more nearly sinusoidal.

Table 1 is a table showing voltages output between the U and V terminals of the inverter circuit 3a corresponding to combinations of on-off conditions of the switch elements 1u to 4u and 1v to 4v. By repeating mode 1 to mode 8 shown in Table 1, a voltage with the waveform shown in FIG. 10 is output between the U and V terminals of the inverter circuit 3a. As shown in FIG. 10 and Table 1, the output voltage of the inverter circuit 3a is of five levels, 0, E, 2E, −E, and −2E.

TABLE 1

| | First Half Bridge | | | | | Second Half Bridge | | | | | Voltage Between U and V Terminals |
|---|---|---|---|---|---|---|---|---|---|---|---|
| | 1u | 2u | 3u | 4u | U Terminal Voltage | 1v | 2v | 3v | 4v | V Terminal Voltage | |
| Mode 1 | On | On | Off | Off | E | On | On | Off | Off | E | 0 |
| Mode 2 | On | On | Off | Off | E | Off | On | On | Off | 0 | E |
| Mode 3 | On | On | Off | Off | E | Off | Off | On | On | −E | 2E |

TABLE 1-continued

|  | First Half Bridge | | | | U Terminal Voltage | Second Half Bridge | | | | V Terminal Voltage | Voltage Between U and V Terminals |
|---|---|---|---|---|---|---|---|---|---|---|---|
|  | 1u | 2u | 3u | 4u |  | 1v | 2v | 3v | 4v |  |  |
| Mode 4 | Off | On | On | Off | 0 | Off | Off | On | On | −E | E |
| Mode 5 | Off | Off | On | On | −E | Off | Off | On | On | −E | 0 |
| Mode 6 | Off | Off | On | On | −E | Off | On | On | Off | 0 | −E |
| Mode 7 | Off | Off | On | On | −E | On | On | Off | Off | E | −2E |
| Mode 8 | Off | On | On | Off | 0 | On | On | Off | Off | E | −E |

FIG. 11 is a circuit configuration diagram of the single phase three-level inverter disclosed in Japanese Patent Publication No. JP-A-2007-28860. The single phase three-level inverter of FIG. 11, with a controller (CN) 6b controlling an on-off condition of switch elements configuring an inverter circuit (IC) 3b, converts a direct current voltage 2E of a power source 1 into a single phase alternating current voltage, and supplies the single phase alternating current voltage to a load 5.

A power source 1, and a first direct current power source and second direct current power source formed of capacitors C1 and C2, are the same as in the heretofore known example shown in FIG. 9. A voltage detector 2 is connected to both ends of the power source 1, and a voltage 2E of the power source 1 is detected by the voltage detector 2.

Next, switch elements 1u and 4u are connected in series to both ends of a series circuit formed of the capacitor C1 and capacitor C2, and a circuit in which switch elements 2u and 3u having reverse withstand voltage are connected in inverse parallel is connected between a connection point of the switch elements 1u and 4u and a connection point of the capacitors C1 and C2. Diodes 1x and 4x are connected in inverse parallel to the switch elements 1u and 4u respectively.

Also, switch elements 1v and 4v are connected in series to both ends of a series circuit formed of the capacitor C1 and capacitor C2, and a circuit in which switch elements 2v and 3v having reverse withstand voltage are connected in inverse parallel is connected between a connection point of the switch elements 1v and 4v and a connection point of the capacitors C1 and C2. Diodes 1y and 4y are connected in inverse parallel to the switch elements 1v and 4v respectively.

Herein, the switch elements 1u to 4u and diodes 1x and 4x configure a first half bridge. Also, the switch elements 1v to 4v and diodes 1y and 4y configure a second half bridge.

Furthermore, the first half bridge and second half bridge configure the inverter circuit 3b.

The connection point of the switch elements 1u and 4u is a U terminal, and the connection point of the switch elements 1v and 4v is a V terminal. The U terminal and V terminal are alternating current output terminals of the inverter circuit 3b. A voltage detector 4 and the load 5 are connected in parallel between the U terminal and V terminal.

Next, the controller 6b outputs gate signals of the switch elements 1u to 4u and 1v to 4v. In order to do this, the controller 6b includes an output voltage command unit 61, a control computation unit 62, and a first PWM controller 63b.

Hereafter, a description will be given of actions of the controller 6b. Of the components of the controller 6b, the output voltage command unit 61 and control computation unit 62 are the same as in the single phase three-level inverter shown in FIG. 9.

The first PWM controller 63b carries out a size comparison of an internally generated carrier signal and a modulation signal output by the control computation unit 62, and generates the gate signals of the switch elements 1u to 4u and 1v to 4v. The on-off conditions of the switch elements 1u to 4u and 1v to 4v are controlled by the gate signals, and a desired alternating current voltage is output between the U and V terminals of the inverter circuit 3b.

Table 2 is a table showing voltages output between the U and V terminals of the inverter circuit 3b corresponding to combinations of the on-off conditions of the switch elements 1u to 4u and 1v to 4v configuring the inverter circuit 3b. By repeating mode 1 to mode 8 shown in Table 2, a voltage with a waveform the same as the waveform shown in FIG. 10 is output between the U and V terminals of the inverter circuit 3b. As shown in FIG. 10 and Table 2, the output voltage of the inverter circuit 3b shown in FIG. 11 is also of five levels, 0, E, 2E, −E, and −2E.

TABLE 2

|  | First Half Bridge | | | | U Terminal Voltage | Second Half Bridge | | | | V Terminal Voltage | Voltage Between U and V Terminals |
|---|---|---|---|---|---|---|---|---|---|---|---|
|  | 1u | 2u | 3u | 4u |  | 1v | 2v | 3v | 4v |  |  |
| Mode 1 | Off | On | On | Off | 0 | Off | On | On | Off | 0 | 0 |
| Mode 2 | Off | On | On | Off | 0 | Off | Off | On | On | −E | E |
| Mode 3 | On | On | Off | Off | E | Off | Off | On | On | −E | 2E |
| Mode 4 | On | On | Off | Off | E | Off | On | On | Off | 0 | E |
| Mode 5 | Off | On | On | Off | 0 | Off | On | On | Off | 0 | 0 |
| Mode 6 | Off | Off | On | On | −E | Off | On | On | Off | 0 | −E |
| Mode 7 | Off | Off | On | On | −E | On | On | Off | Off | E | −2E |
| Mode 8 | Off | On | On | Off | 0 | On | On | Off | Off | E | −E |

However, in the heretofore known examples, the single phase three-level inverter carries out a switching action in full bridge mode regardless of the size of the alternating current output voltage. That is, as shown in Table 1 and Table 2, all the switch elements (1u to 4u and 1v to 4v) configuring the first half bridge and second half bridge alternate on and off conditions. Because of this, there is a problem in that conduction loss and switching loss occur in all the switch elements, and conduction loss and reverse recovery loss occur in all the diodes.

SUMMARY OF THE INVENTION

Therefore, embodiments of the invention, having been contrived in order to address one or more of the heretofore described problem, have an object of reducing loss occurring in an inverter circuit by causing a single phase three-level inverter that normally acts in full bridge mode to act in half bridge mode when the amplitude of a fundamental wave of an alternating current output voltage is lower than a voltage E of a first direct current power source and a second direct current power source.

A power conversion device of one aspect of the invention includes an inverter circuit formed of a first half bridge and a second half bridge, and a controller that generates gate signals of switch elements configuring the first and second half bridges, wherein the controller includes a first PWM controller that generates gate signals for causing the inverter circuit to act in full bridge mode, a second PWM controller that generates gate signals for causing the inverter circuit to act in half bridge mode, and a gate signal switching unit that switches between the output of the first PWM controller and the output of the second PWM controller.

Then, the controller outputs the output of the second PWM controller as the gate signals of the inverter circuit when the amplitude of the fundamental wave of the alternating current output voltage is lower than the voltage E of the first direct current power source and second direct current power source.

Also, the controller includes a bridge switching unit. The bridge switching unit outputs a signal for switching to the bridge to be caused to carry out a switching action. The signal output by the bridge switching unit is used in the second PWM controller in a process of interchanging the gate signals of the first half bridge and second half bridge.

According to embodiments of the invention, it is possible to obtain a desired alternating current output voltage by causing a single phase three-level inverter to act in half bridge mode when the amplitude of a fundamental wave of an alternating current output voltage is lower than a voltage E of a first direct current power source and a second direct current power source. Furthermore, as the single phase three-level inverter is caused to act in half bridge mode, it is possible to reduce by half the number of switch elements carrying out a switching action compared with when causing the inverter to act in full bridge mode. Because of this, it is possible to reduce loss occurring in the inverter circuit.

In particular, it is possible to effectively utilize the above benefit in a single phase three-level inverter used in an application variably controlling output voltage between 0V and a rated voltage, or an application in which direct current input voltage fluctuates considerably.

DETAILED DESCRIPTION

Figure 1:
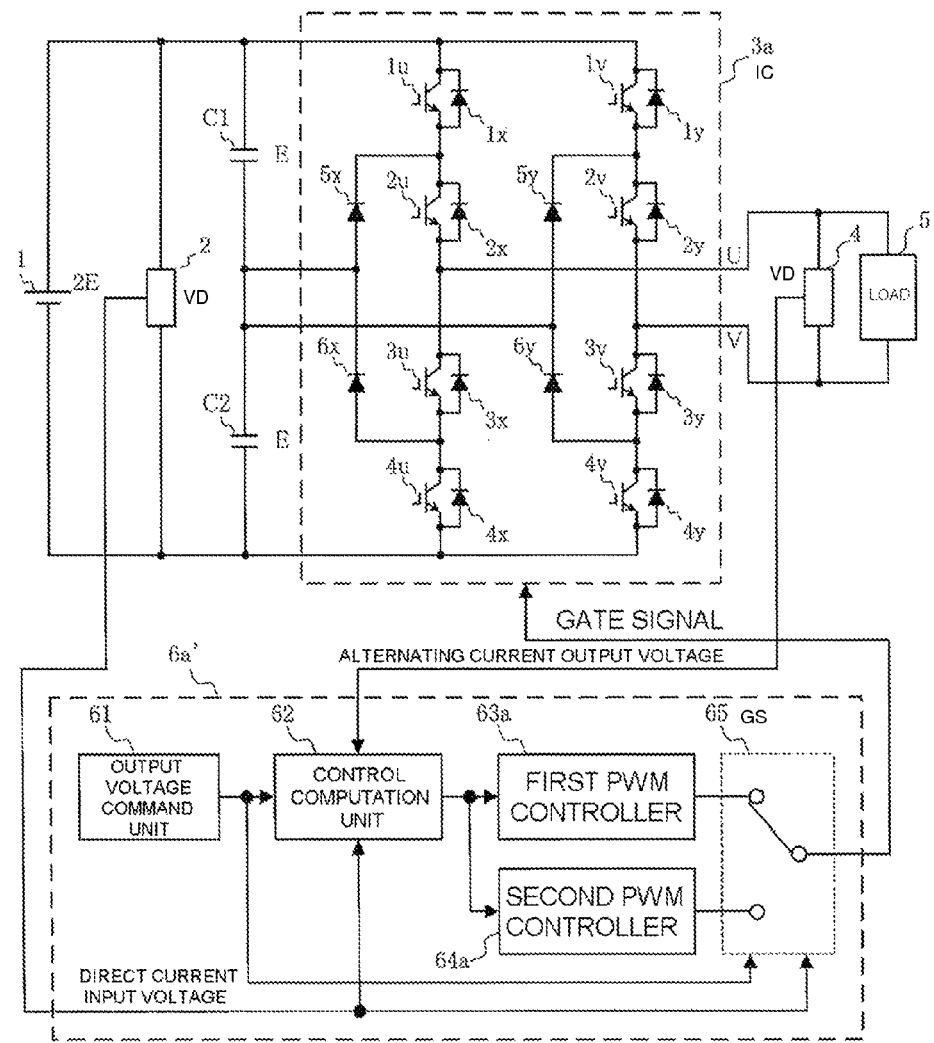
FIG. 1 is a circuit configuration diagram of a power conversion device according to a first embodiment of the invention.

Hereafter, a detailed description will be given of certain embodiments of the invention, based on FIGS. 1 to 8. Components in FIGS. 1 to 8 the same as components shown in FIGS. 9 and 11, which are examples of embodiments of a heretofore known power conversion device, are given the same reference numerals and characters, and a description thereof is omitted.

FIG. 1 is a circuit diagram showing the configuration of a single phase three-level inverter according to a first embodiment of the invention. A feature of the first embodiment is that, of components of a heretofore known single phase three-level inverter shown in FIG. 9, a controller 6a is made a controller 6a', while other components are the same.

Hereafter, a description will be given of the configuration and actions of the controller 6a'. The controller 6a' includes an output voltage command unit 61, a control computation unit 62, and a first PWM controller 63a, in the same way as the controller 6a, and furthermore, includes a second PWM controller 64a and a gate signal selector (GS) 65.

Figure 9:
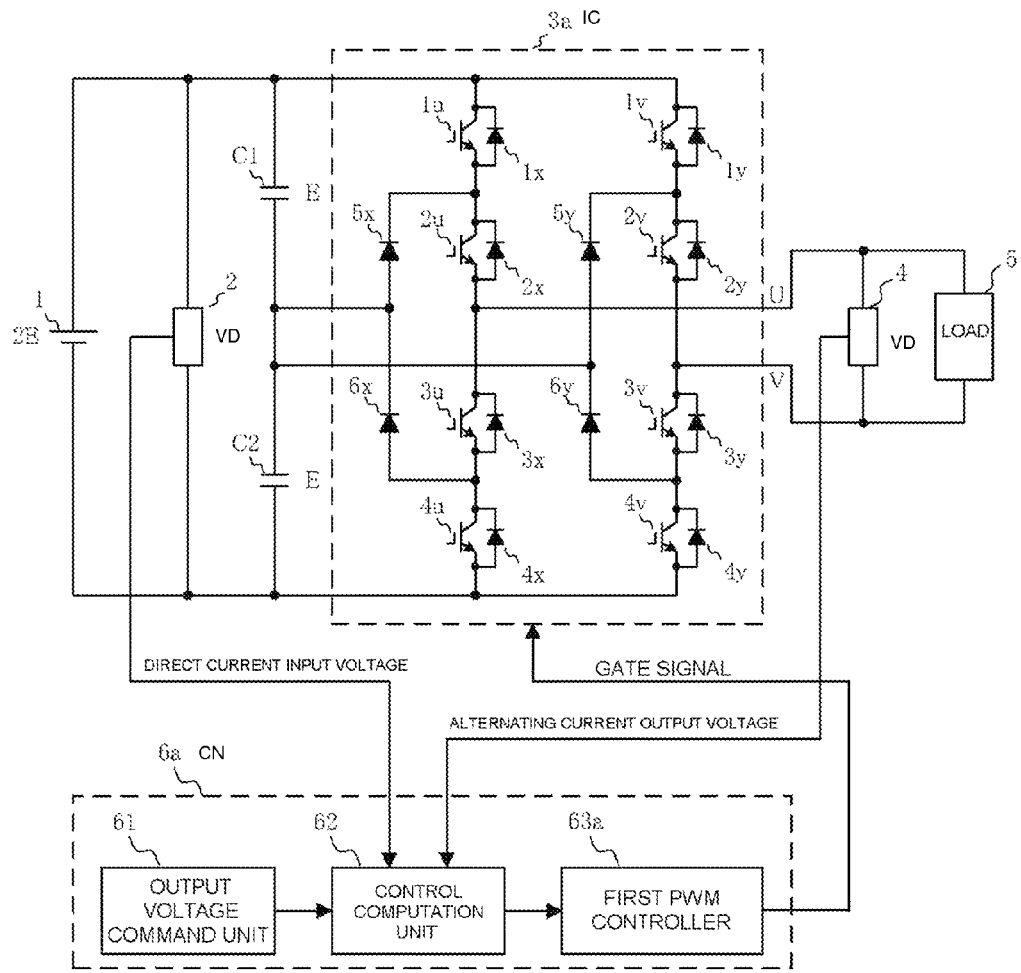
FIG. 9 is a circuit configuration diagram showing an example of a heretofore known power conversion device.
Figure 10:
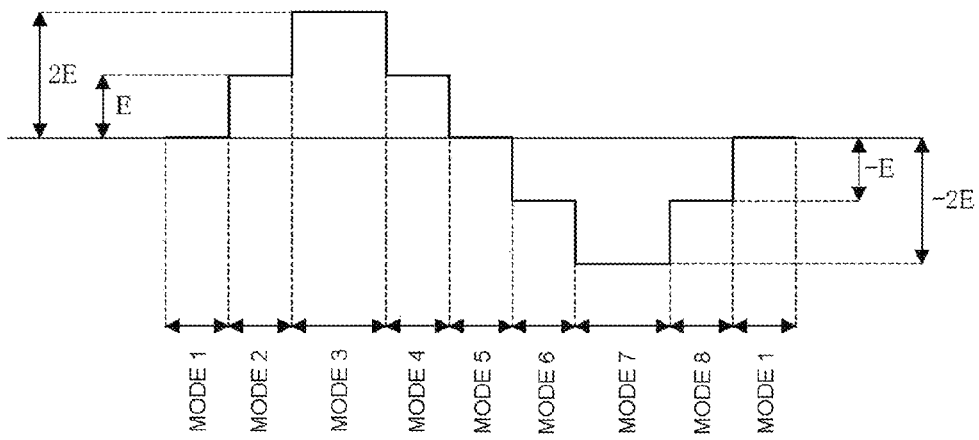
FIG. 10 is a diagram showing an output voltage waveform of the heretofore known power conversion device.

Herein, the first PWM controller 63a, with a modulation signal output by the control computation unit 62 as an input, generates gate signals for on-off controlling switch elements 1u to 4u and 1v to 4v configuring an inverter circuit 3a in full bridge mode, in the same way as in the heretofore known single phase three-level inverter shown in FIG. 9.

Also, the second PWM controller 64a, with a modulation signal output by the control computation unit 62 as an input, generates gate signals for on-off controlling the switch elements 1u to 4u and 1v to 4v configuring the inverter circuit (IC) 3a in half bridge mode.

The gate signal selector 65 selects either the output signal of the first PWM controller 63a or the output signal of the second PWM controller 64a, and outputs the selected signal as the gate signals of the inverter circuit 3a.

When determining which of the output signal of the first PWM controller 63a and the output signal of the second PWM controller 64a to select, the voltage of a power source 1 detected by a voltage detector 2 and an output voltage command output by the output voltage command unit 61 are referred to.

For example, when the amplitude of a fundamental wave of an alternating current output voltage is higher than a voltage E of a first direct current power source and second direct current power source, the gate signal selector 65 outputs the output of the first PWM controller 63a as the gate signals. Meanwhile, when the amplitude of the fundamental wave of the alternating current output voltage is lower than the voltage E of the first direct current power source and second direct current power source, the gate signal selector 65 outputs the output of the second PWM controller 64a as the gate signals.

The inverter circuit 3a acts in full bridge mode when the output of the first PWM controller 63a is output as the gate signals from the gate signal selector 65, and acts in half bridge mode when the output of the second PWM controller 64a is output as the gate signals.

Figure 2:
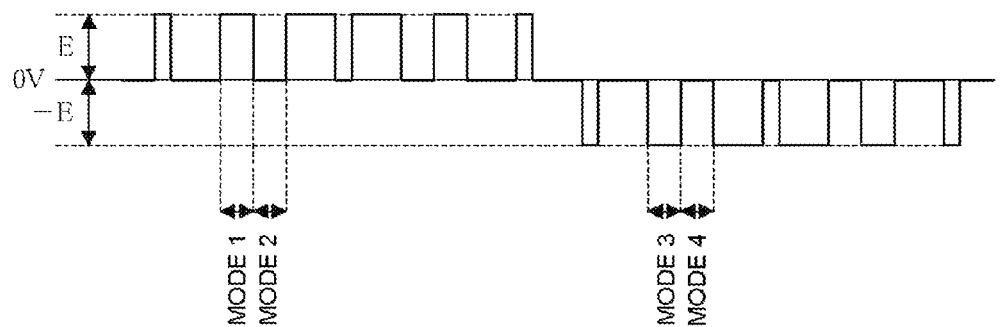
FIG. 2 is an output voltage waveform of a three-level inverter according to the first embodiment.

FIG. 2 is a diagram showing an example of an output voltage waveform generated between U and V terminals when the inverter circuit 3a shown in FIG. 1 acts in half bridge mode. Table 3 is an example showing output voltages corresponding to combinations of on-off conditions of the switch elements 1u to 4u and 1v to 4v when the inverter circuit 3a acts in half bridge mode in a first half bridge. As shown in FIG. 2 and Table 3, the voltage output between the U and V terminals of the inverter circuit 3a is of three levels, 0, E, and −E.

When in mode 2 and mode 4, the first half bridge and second half bridge switch elements 2u, 3u, 2v, and 3v are in an on condition, and the switch elements 1u, 4u, 1v, and 4v are in an off condition. Consequently, the voltage between the U and V terminals of the inverter circuit 3a becomes 0V.

The controller 6a', by causing the inverter circuit 3a to act in half bridge mode based on pulse width modulated gate signals in this way, can output an alternating current voltage between the U and V terminals.

According to the above, when causing the inverter circuit 3a to act in half bridge mode in the first half bridge, a conduction loss occurs only in the switch elements 2v and 3v in the second half bridge, and no conduction loss occurs in the switch elements 1v and 4v. Also, no switching loss occurs in any of the switch elements 1v to 4v configuring the second half bridge.

Consequently, compared with when causing the inverter circuit 3a to act in full bridge mode in the first half bridge and second half bridge, it is possible to reduce the loss of the inverter circuit 3a. As a result of this, it is possible to improve the efficiency of the inverter circuit 3a.

Figure 5:
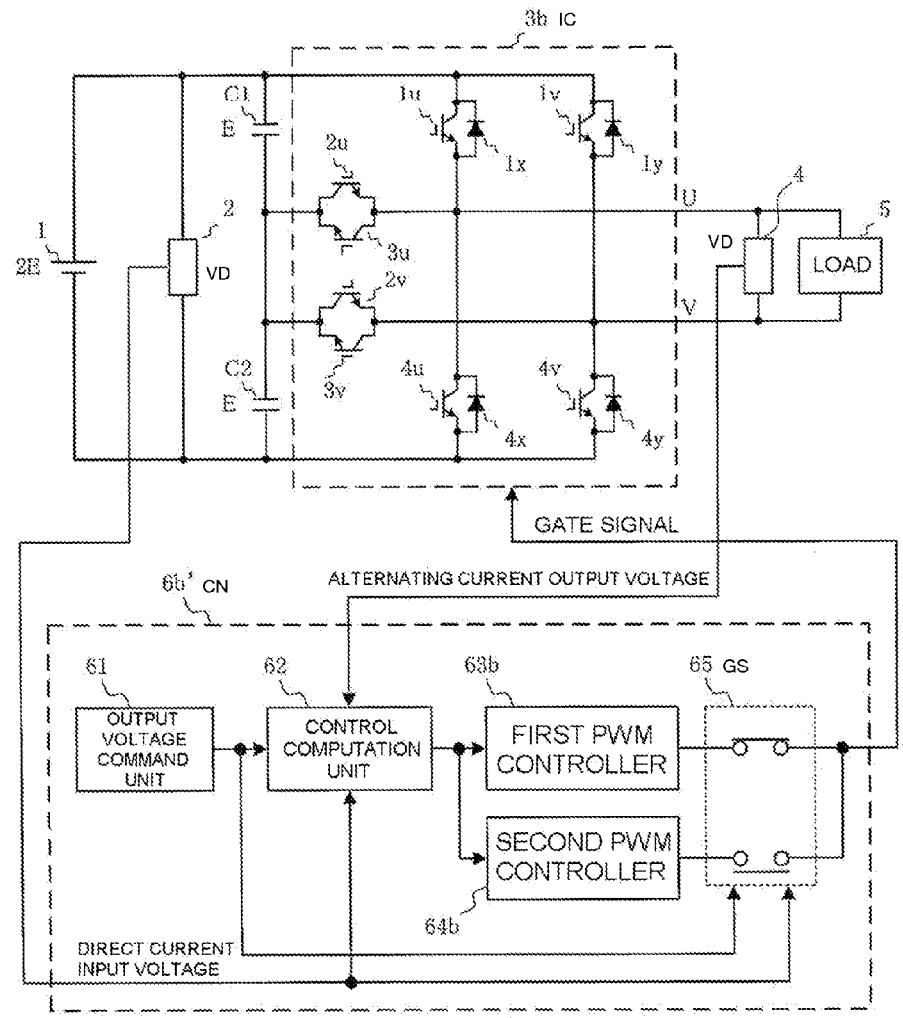
FIG. 5 is a circuit configuration diagram of a power conversion device according to a second embodiment of the invention.

FIG. 5 is a circuit diagram showing the configuration of a single phase three-level inverter according to a second embodiment of the invention. A feature of the second

TABLE 3

| | First Half Bridge | | | | Second Half Bridge | | | | Voltage |
|---|---|---|---|---|---|---|---|---|---|
| | 1u | 2u | 3u | 4u | U Terminal Voltage | 1v | 2v | 3v | 4v | V Terminal Voltage | Between U and V Terminals |
| Mode 1 | On | On | Off | Off | E | Off | On | On | Off | 0 | E |
| Mode 2 | Off | On | On | Off | 0 | Off | On | On | Off | 0 | 0 |
| Mode 3 | Off | Off | On | On | −E | Off | On | On | Off | 0 | −E |
| Mode 4 | Off | On | On | Off | 0 | Off | On | On | Off | 0 | 0 |

Figure 3:
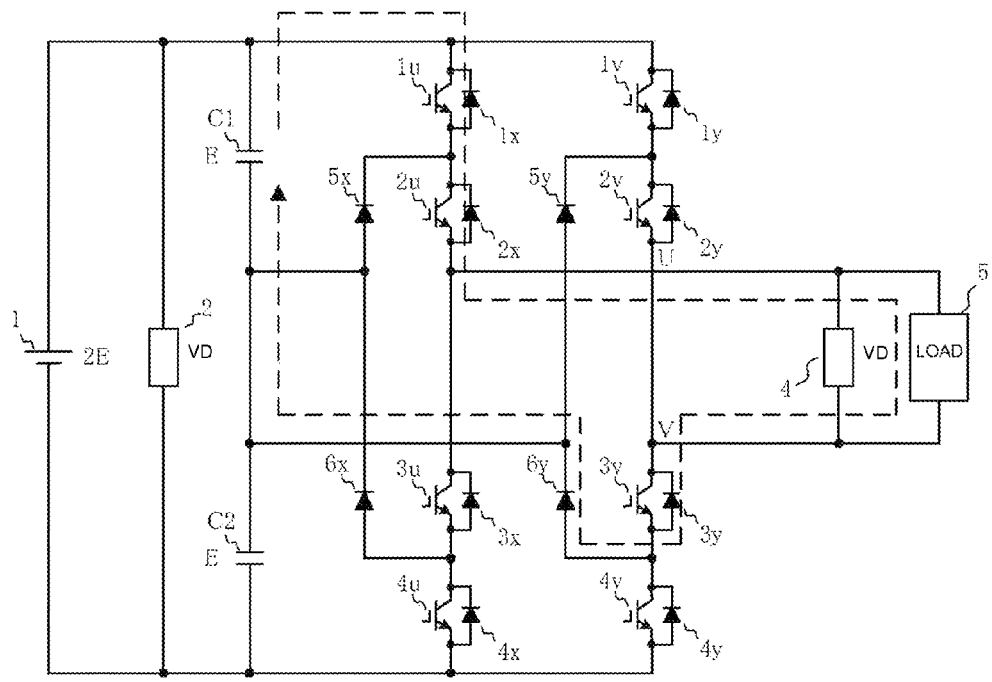
FIG. 3 is a diagram illustrating an action of mode 1 in the first embodiment.

FIG. 3 is a diagram illustrating, of the half bridge actions of the inverter circuit 3a shown in FIG. 1, the action of mode 1 shown in FIG. 2 and Table 3. Mode 1 is a mode in which the voltage between the U and V terminals of the inverter circuit 3a becomes E.

As shown in Table 3, the second half bridge switch elements 1v and 4v are always in an off condition, and the switch elements 2v and 3v are always in an on condition. Consequently, when the first half bridge switch elements 1u and 2u are simultaneously in an on condition (3u and 4u are in an off condition), the voltage E of the first direct current power source (a capacitor C1) is applied to a load 5 along a path from the capacitor C1 through the switch elements 1u and 2u, load 5, switch element 3v, and a diode 6y, to the capacitor C1 (FIG. 3).

Figure 4:
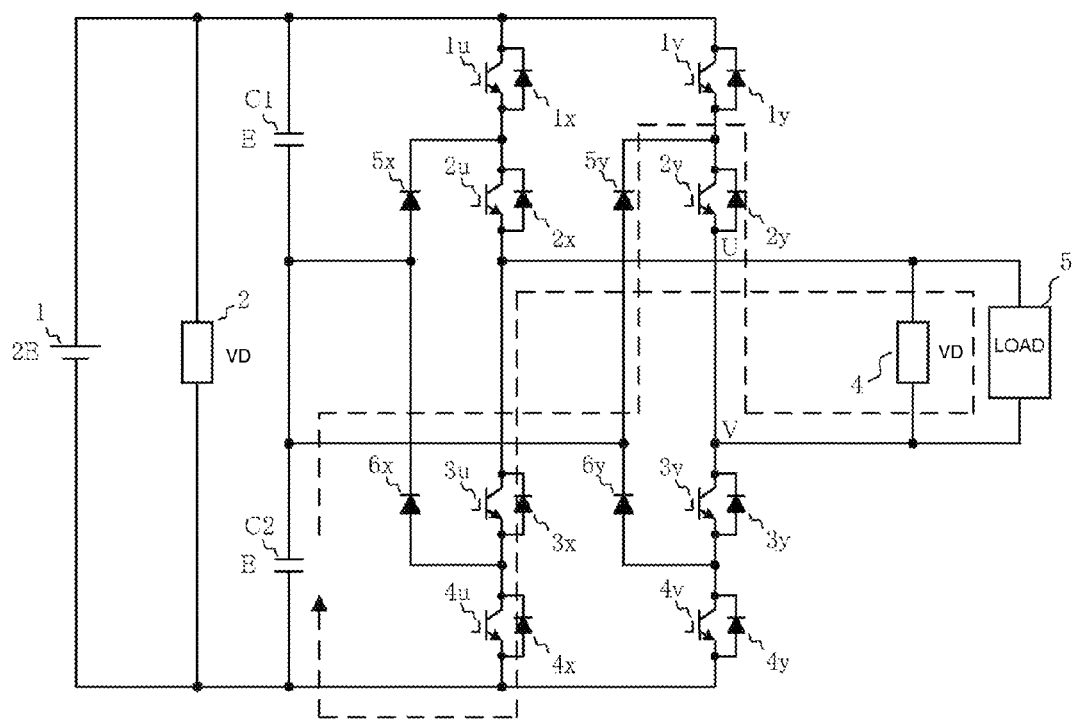
FIG. 4 is a diagram illustrating an action of mode 3 in the first embodiment.

FIG. 4 is a diagram illustrating, of the half bridge actions of the inverter circuit 3a shown in FIG. 1, the action of mode 3 shown in FIG. 2 and Table 3. Mode 3 is a mode in which the voltage between the U and V terminals of the inverter circuit 3a becomes −E.

Figure 11:
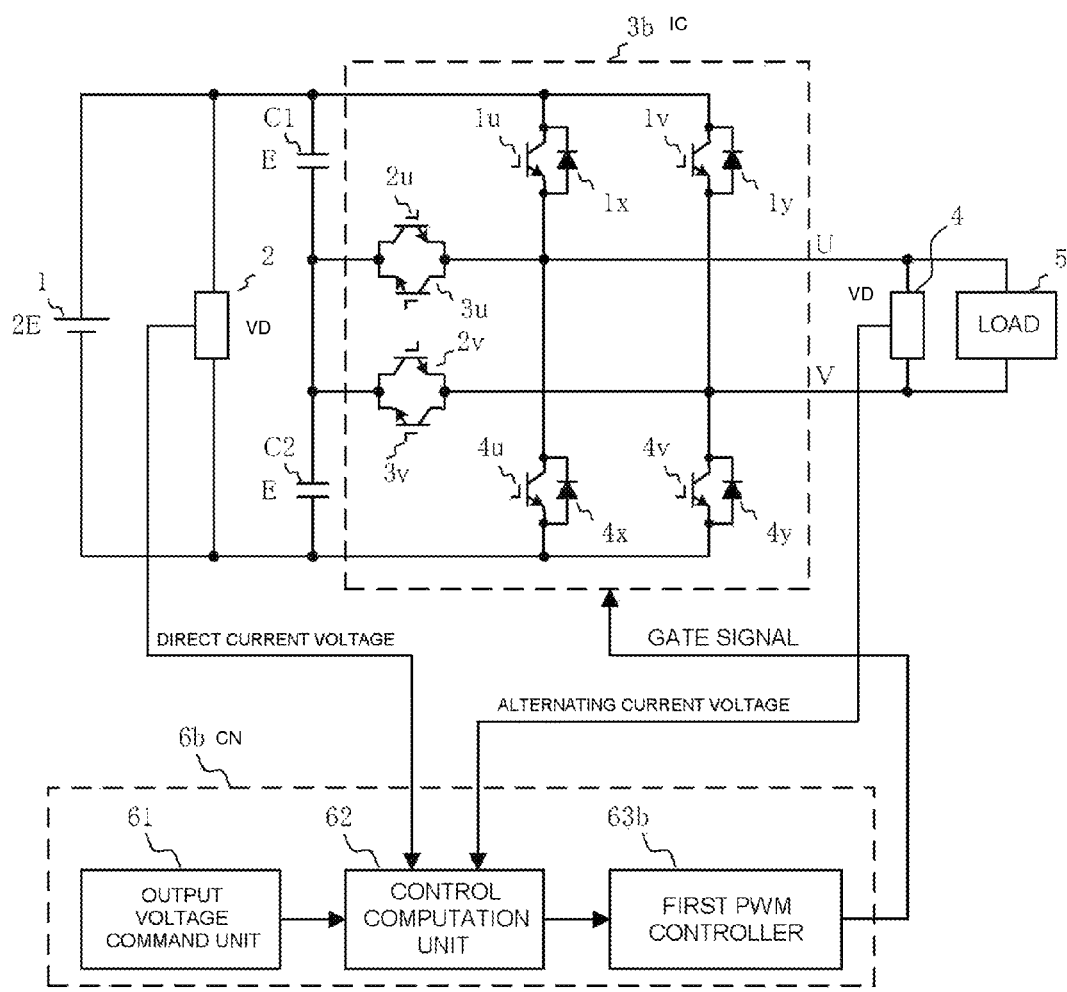
FIG. 11 is a circuit configuration diagram showing another example of a heretofore known power conversion device.

As shown in Table 3, the second half bridge switch elements 1v and 4v are always in an off condition, and the switch elements 2v and 3v are always in an on condition. Consequently, when the first half bridge switch elements 3u and 4u are simultaneously in an on condition (1u and 2u are in an off condition), the voltage E of the second direct current power source (a capacitor C2) is applied to the load 5 along a path from the capacitor C2 through a diode 5y, the switch element 2v, load 5, and switch elements 3u and 4u, to the capacitor C2 (FIG. 4).

embodiment is that, of components of a heretofore known single phase three-level inverter shown in FIG. 11, a controller 6b is made a controller 6b', while other components are the same.

Hereafter, a description will be given of the configuration and actions of the controller 6b'. The controller 6b' includes an output voltage command unit 61, a control computation unit 62, and a first PWM controller 63b, in the same way as the controller 6b, and furthermore, includes a second PWM controller 64b and a gate signal selector 65.

Herein, the first PWM controller 63b, with a modulation signal output by the control computation unit 62 as an input, generates gate signals for on-off controlling switch elements 1u to 4u and 1v to 4v configuring an inverter circuit 3b in full bridge mode, in the same way as in the heretofore known single phase three-level inverter shown in FIG. 11.

Also, the second PWM controller 64b, with a modulation signal output by the control computation unit 62 as an input, generates gate signals for on-off controlling the switch elements 1u to 4u and 1v to 4v configuring the inverter circuit 3b in half bridge mode.

The gate signal selector 65 selects either the output signal of the first PWM controller 63b or the output signal of the second PWM controller 64b, and outputs the selected signal as the gate signals of the inverter circuit 3b.

When determining which of the output signal of the first PWM controller 63b and the output signal of the second PWM controller 64b to select, the voltage of a power source 1 detected by a voltage detector 2 and an output voltage command output by the output voltage command unit 61 are referred to.

For example, when the amplitude of a fundamental wave of an alternating current output voltage is higher than a voltage E of a first direct current power source and second direct current power source, the gate signal selector 65 outputs the output of the first PWM controller 63b as the gate signals. Meanwhile, when the amplitude of the fundamental wave of the alternating current output voltage is lower than the voltage E of the first direct current power source and second direct current power source, the gate signal selector 65 outputs the output of the second PWM controller 64b as the gate signals.

The inverter circuit 3b acts in full bridge mode when the output of the first PWM controller 63b is output as the gate signals from the gate signal selector 65, and acts in half bridge mode when the output of the second PWM controller 64b is output as the gate signals.

When the inverter circuit 3b acts in half bridge mode, the waveform of an output voltage generated between U and V terminals is the same as that in FIG. 2. Table 4 is an example showing output voltages corresponding to combinations of on-off conditions of the switch elements 1u to 4u and 1v to 4v when the inverter circuit 3b acts in half bridge mode in a first half bridge. As shown in FIG. 2 and Table 4, the voltage output between the U and V terminals of the inverter circuit 3b is of three levels, 0, E, and −E.

When in mode 2 and mode 4, the first half bridge and second half bridge switch elements 2u, 3u, 2v, and 3v are in an on condition, and the switch elements 1u, 4u, 1v, and 4v are in an off condition. Consequently, the voltage between the U and V terminals of the inverter circuit 3b becomes 0V.

The controller 6b', by causing the inverter circuit 3a to act in half bridge mode based on pulse width modulated gate signals in this way, can output an alternating current voltage between the U and V terminals.

According to the above, when causing the inverter circuit 3b to act in half bridge mode in the first half bridge, a conduction loss occurs only in the switch elements 2v and 3v in the second half bridge, and no conduction loss occurs in the switch elements 1v and 4v. Also, no switching loss occurs in any of the switch elements 1v to 4v configuring the second half bridge.

Consequently, compared with when causing the inverter circuit 3b to act in full bridge mode in the first half bridge and second half bridge, it is possible to reduce the loss of the inverter circuit 3b. As a result of this, it is possible to improve the efficiency of the inverter circuit 3b.

Even when replacing each of the switch elements 2u, 3u, 2v, and 3v in FIG. 5 with a circuit in which a switch element and diode are connected in series, it is possible to cause the inverter circuit 3b to act in half bridge mode, and it is possible to reduce loss.

TABLE 4

| | First Half Bridge | | | | | Second Half Bridge | | | | Voltage Between U |
|---|---|---|---|---|---|---|---|---|---|---|
| | 1u | 2u | 3u | 4u | U Terminal Voltage | 1v | 2v | 3v | 4v | V Terminal Voltage | and V Terminals |
| Mode 1 | On | On | Off | Off | E | Off | On | On | Off | 0 | E |
| Mode 2 | Off | On | On | Off | 0 | Off | On | On | Off | 0 | 0 |
| Mode 3 | Off | Off | On | On | −E | Off | On | On | Off | 0 | −E |
| Mode 4 | Off | On | On | Off | 0 | Off | On | On | Off | 0 | 0 |

Figure 6:
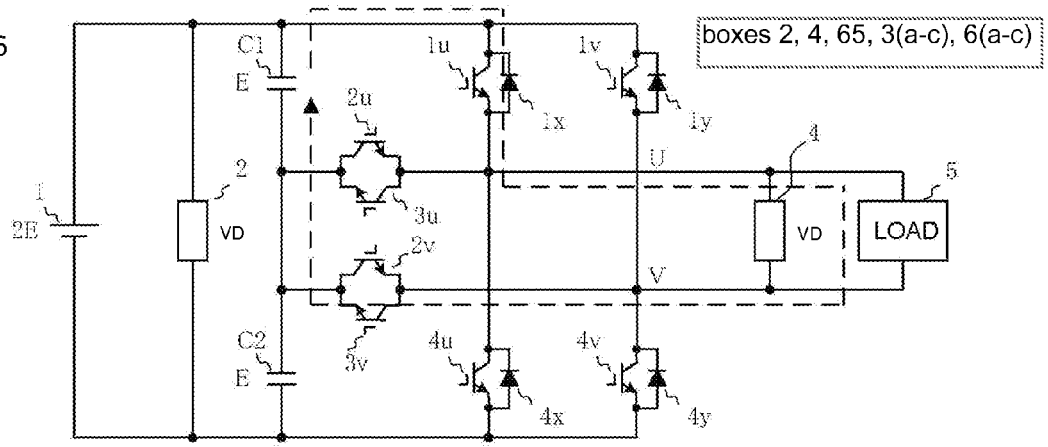
FIG. 6 is a diagram illustrating an action of mode 1 in the second embodiment.

FIG. 6 is a diagram illustrating, of the half bridge actions of the inverter circuit 3b shown in FIG. 5, the action of mode 1 shown in FIG. 2 and Table 4. Mode 1 is a mode in which the voltage between the U and V terminals of the inverter circuit 3b becomes E.

As shown in Table 4, the second half bridge switch elements 1v and 4v are always in an off condition, and the switch elements 2v and 3v are always in an on condition. Consequently, when the first half bridge switch element 1u is in an on condition (4u is in an off condition), the voltage E of the first direct current power source is applied to a load 5 along a path from a capacitor C1 through the switch element 1u, load 5, and switch element 3v, to the capacitor C1 (FIG. 6).

Figure 7:
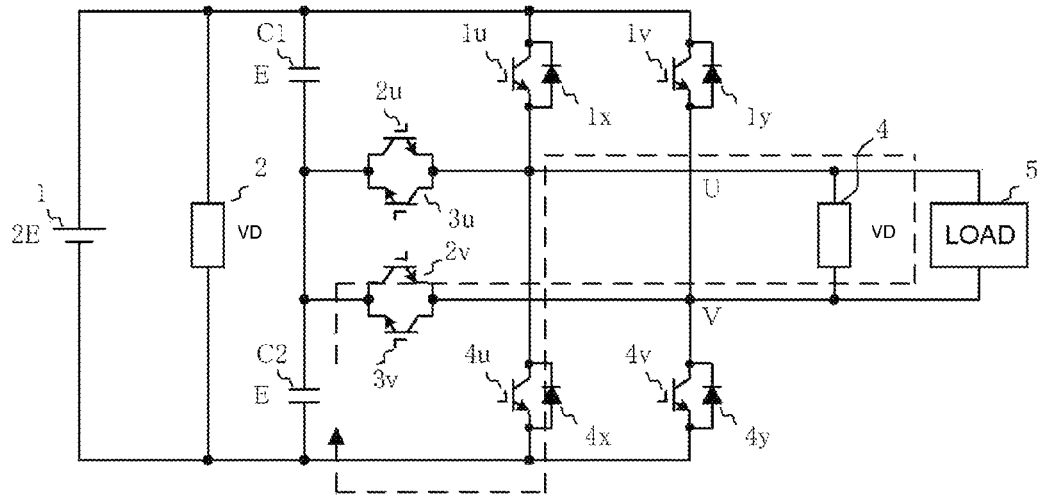
FIG. 7 is a diagram illustrating an action of mode 3 in the second embodiment.

FIG. 7 is a diagram illustrating, of the half bridge actions of the inverter circuit 3b shown in FIG. 5, the action of mode 3 shown in FIG. 2 and Table 4. Mode 3 is a mode in which the voltage between the U and V terminals of the inverter circuit 3b becomes −E.

As shown in Table 4, the second half bridge switch elements 1v and 4v are always in an off condition, and the switch elements 2v and 3v are always in an on condition. Consequently, when the first half bridge switch element 4u is in an on condition (1u is in an off condition), the voltage E of the second direct current power source is applied to the load 5 along a path from a capacitor C2 through the switch element 2v, load 5, and switch element 4u, to the capacitor C2 (FIG. 7).

Also, even when replacing each of the circuit in which the switch elements 2u and 3u are connected in inverse parallel and the circuit in which the switch elements 2v and 3v are connected in inverse parallel in FIG. 5 with a circuit in which circuits in which a switch element and diode are connected in inverse parallel are connected in anti-series, it is possible to cause the inverter circuit 3b to act in half bridge mode, and it is possible to reduce loss.

Also, in the first embodiment and second embodiment, a description has been given using as an example a case in which a desired output voltage is obtained between the U and V terminals of the inverter circuits 3a and 3b by causing the inverter circuit to act in half bridge mode in the first half bridge, but it is also possible to reduce the loss of the inverter circuits 3a and 3b in the same way by causing the inverter circuit to act in half bridge mode in the second half bridge.

Figure 8:
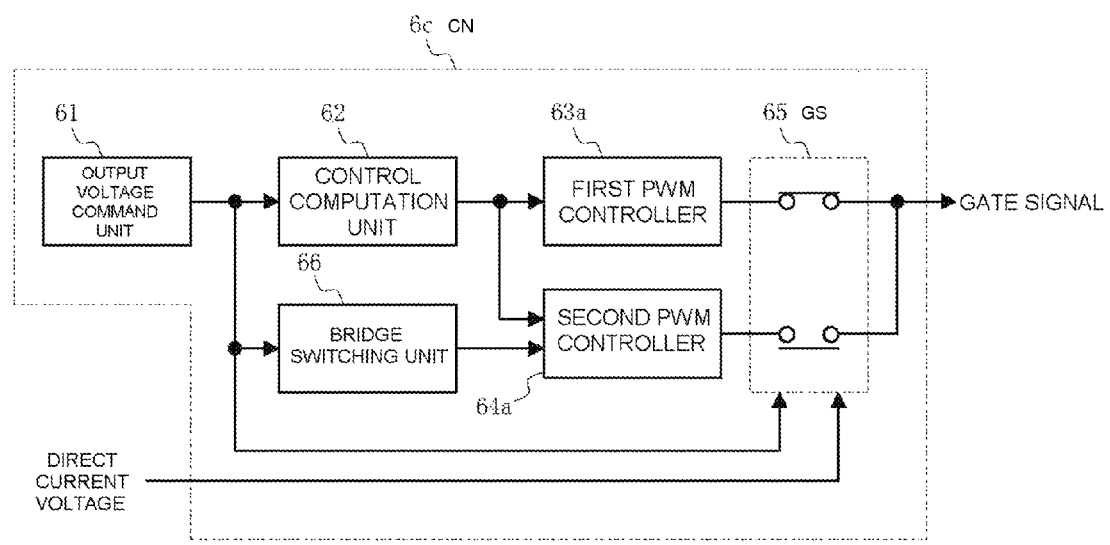
FIG. 8 is a block diagram showing another embodiment of a controller according to the invention.

As a more preferred embodiment, it is possible, when causing the inverter circuits 3a and 3b to act in half bridge mode, to cause the first half bridge and second half bridge to act in half bridge mode alternately, for example, every half cycle of the alternating current output voltage. FIG. 8 shows the configuration of a controller (CN) 6c as a third embodiment for enabling this kind of action. To describe using the first embodiment as an example, a feature of the controller 6c is that a bridge switching unit 66 is further provided in the configuration of the controller 6a' of FIG. 1.

The bridge switching unit 66, based on an output voltage command output by the output voltage command unit 61, outputs a signal specifying the bridge to be caused to act in half bridge mode. For example, the bridge switching unit 66 outputs a signal specifying the first half bridge when the polarity of the output voltage command is positive, and outputs a signal specifying the second half bridge when the polarity of the output voltage command is negative.

The second PWM controller 64a, based on the bridge specification signal output by the bridge switching unit 66, outputs gate signals for causing either the first half bridge or second half bridge to act in half bridge mode.

Specifically, when the bridge specification signal specifies the first half bridge, the second PWM controller 64a outputs gate signals corresponding to the on-off condition of the switch elements 1u to 4u and 1v to 4v corresponding to mode 1 to mode 4 shown in Table 3 as the gate signals of the first half bridge and second half bridge.

Meanwhile, when the bridge specification signal specifies the second half bridge, the second PWM controller 64a transposes the gate signals corresponding to the on-off condition of the switch elements 1u to 4u and 1v to 4v corresponding to mode 1 to mode 4 shown in Table 3, and outputs them as the gate signals of the first half bridge and second half bridge.

By switching the actions of the first half bridge and second half bridge in this way, loss occurs evenly in the switch elements and diodes of the first half bridge and second half bridge, and it is possible to average heat duty between the bridges.

As a result of this, it is possible to standardize the cooling design of the first half bridge and second half bridge, and it is also possible to reduce the price by standardizing the cooling member.

The controller 6c can also be applied to the second embodiment, and it is possible to obtain the same advantage as that heretofore described.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments can be combined, as would be understood by one of skill in the art.

This application is based on, and claims priority to, Japanese Patent Application No. 2010-164735, filed on Jul. 22, 2010. The disclosure of the priority application, in its entirety, including the drawings, claims, and the specification thereof, is incorporated herein by reference.

What is claimed is:

1. A power conversion device comprising:
a power converter formed of a first half bridge and a second half bridge that converts a direct current input voltage into alternating current phase voltages having three levels of potential, which are positive, negative, and intermediate voltages, by controlling on-off conditions of a plurality of switch elements; and
a controller that, by supplying gate signals to the switch elements configuring the first half bridge and the second half bridge, controls the on-off conditions thereof, wherein the controller includes:
a first PWM controller that outputs gate signals for causing the power converter to act in a full bridge mode;
a second PWM controller that outputs gate signals for causing the power converter to act in a half bridge mode; and
a gate signal selector that automatically selects and outputs either the output of the first PWM controller or the output of the second PWM controller as gate signals of the switch elements, and that outputs, when the output of the second PWM controller is selected, the selected gate signals to the first half bridge and the second half bridge alternately every half cycle of the output voltage.

2. The power conversion device according to claim 1, wherein
the gate signal selector, when it is possible to output the alternating current phase voltages by on-off controlling only the switch elements of either the first or second half bridge, outputs the output of the second PWM controller as the gate signals of the switch elements.

3. The power conversion device according to claim 1, wherein
the direct current input voltage is evenly divided in series by a first direct current voltage source and second direct current voltage source, and
the gate signal selector, when the voltage values of the first power source and second power source are larger than the amplitude value of the alternating current phase voltage command, outputs the output of the second PWM controller as the gate signals of the switch elements.

4. The power conversion device according to claim 1, wherein
the half bridge of the power converter includes:
a first terminal and second terminal connected to either end of a first direct current voltage source and second direct current voltage source connected in series;
a third terminal connected to the connection point of the first direct current voltage source and second direct current voltage source;
a first circuit having first, second, third, and fourth switch elements connected in series and first, second, third, and fourth diodes connected in inverse parallel to the first, second, third, and fourth switch elements respectively, wherein either end of a series circuit in which the first, second, third, and fourth switch elements are connected in series is connected to the first terminal and second terminal, and the connection point of the second switch element and third switch element is an alternating current output terminal;
a fifth diode connected between the third terminal and the connection point of the first switch element and second switch element; and
a sixth diode connected between the connection point of the third switch element and fourth switch element and the third terminal.

5. The power conversion device according to claim 1, wherein
the half bridge of the power converter includes:
a first terminal and second terminal connected to either end of a first direct current voltage source and second direct current voltage source connected in series;
a third terminal connected to the connection point of the first direct current voltage source and second direct current voltage source;

a first circuit having a first switch element and fourth switch element connected in series and a first diode connected in inverse parallel to the first switch element and a fourth diode connected in inverse parallel to the fourth switch element, wherein either end of the first switch element and fourth switch element connected in series is connected to the first terminal and second terminal, and the connection point of the first switch element and fourth switch element is an alternating current output terminal; and a second circuit in which a second switch element and third switch element having reverse withstand voltage are connected in inverse parallel, one connection point connected in inverse parallel is connected to the third terminal, and the other connection point connected in inverse parallel is connected to the alternating current output terminal.

6. The power conversion device according to claim 1, wherein the half bridge of the power converter includes:

a first terminal and second terminal connected to either end of a first direct current voltage source and second direct current voltage source connected in series;

a third terminal connected to the connection point of the first direct current voltage source and second direct current voltage source;

a first circuit having a first switch element and fourth switch element connected in series and a first diode connected in inverse parallel to the first switch element and a fourth diode connected in inverse parallel to the fourth switch element, wherein either end of the first switch element and fourth switch element connected in series is connected to the first terminal and second terminal, and the connection point of the first switch element and fourth switch element is an alternating current output terminal; and a second circuit in which a second switch element and third switch element, to each of which a diode is connected in inverse parallel, are connected in series in a reverse direction, one connection point connected in series is connected to the third terminal, and the other connection point connected in series is connected to the alternating current output terminal.

7. The power conversion device according to claim 1, wherein the half bridge of the power converter includes:

a first terminal and second terminal connected to either end of a first direct current voltage source and second direct current voltage source connected in series;

a third terminal connected to the connection point of the first direct current voltage source and second direct current voltage source;

a first circuit having a first switch element and fourth switch element connected in series and a first diode connected in inverse parallel to the first switch element and a fourth diode connected in inverse parallel to the fourth switch element, wherein either end of the first switch element and fourth switch element connected in series is connected to the first terminal and second terminal, and the connection point of the first switch element and fourth switch element is an alternating current output terminal; and a second circuit in which a circuit in which a second switch element and diode are connected in series, and a circuit in which a third switch element and diode are connected in series, are connected in inverse parallel, one connection point connected in inverse parallel is connected to the third terminal, and the other connection point connected in inverse parallel is connected to the alternating current output terminal.

8. A power conversion device comprising:

a power converter formed of a first half bridge and a second half bridge that converts a direct current input voltage into alternating current phase voltages having three levels of potential, which are positive, negative, and intermediate voltages, by controlling on-off conditions of a plurality of switch elements; and a controller that, by supplying gate signals to the switch elements configuring the first half bridge and the second half bridge, controls the on-off conditions thereof, wherein the controller includes:

a first PWM controller that outputs gate signals for causing the power converter to act in a full bridge mode, a second PWM controller that outputs gate signals for causing the power converter to act in a half bridge mode;

a gate signal selector that automatically outputs either the output of the first PWM controller or the output of the second PWM controller as gate signals of the switch elements; and a bridge switching unit that causes the first half bridge and the second half bridge to act alternately every half cycle of the alternating current phase voltages when causing the power converter to act in the half bridge mode.

9. The power conversion device according to claim 8, wherein the half bridge of the power converter includes:

a first terminal and second terminal connected to either end of a first direct current voltage source and second direct current voltage source connected in series;

a third terminal connected to the connection point of the first direct current voltage source and second direct current voltage source;

a first circuit having first, second, third, and fourth switch elements connected in series and first, second, third, and fourth diodes connected in inverse parallel to the first, second, third, and fourth switch elements respectively, wherein either end of a series circuit in which the first, second, third, and fourth switch elements are connected in series is connected to the first terminal and second terminal, and the connection point of the second switch element and third switch element is an alternating current output terminal;

a fifth diode connected between the third terminal and the connection point of the first switch element and second switch element; and a sixth diode connected between the connection point of the third switch element and fourth switch element and the third terminal.

10. The power conversion device according to claim 8, wherein the half bridge of the power converter includes:

a first terminal and second terminal connected to either end of a first direct current voltage source and second direct current voltage source connected in series;

a third terminal connected to the connection point of the first direct current voltage source and second direct current voltage source;

a first circuit having a first switch element and fourth switch element connected in series and a diode connected in inverse parallel to the first switch element and fourth switch element, wherein either end of the first switch element and fourth switch element connected in series is connected to the first terminal and second terminal, and the connection point of the first switch element and fourth switch element is an alternating current output terminal; and a second circuit in which a second switch element and third switch element having reverse withstand voltage are connected in inverse parallel, one connection point connected in inverse parallel is connected to the third terminal, and the other connection point connected in inverse parallel is connected to the alternating current output terminal.

11. The power conversion device according to claim 8, wherein the half bridge of the power converter includes:

a first terminal and second terminal connected to either end of a first direct current voltage source and second direct current voltage source connected in series;

a third terminal connected to the connection point of the first direct current voltage source and second direct current voltage source;

a first circuit having a first switch element and fourth switch element connected in series and a diode connected in inverse parallel to the first switch element and fourth switch element, wherein either end of the first switch element and fourth switch element connected in series is connected to the first terminal and second terminal, and the connection point of the first switch element and fourth switch element is an alternating current output terminal; and a second circuit in which a second switch element and third switch element, to each of which a diode is connected in inverse parallel, are connected in series in a reverse direction, one connection point connected in series is connected to the third terminal, and the other connection point connected in series is connected to the alternating current output terminal.

12. The power conversion device according to claim 8, wherein the half bridge of the power converter includes:

a first terminal and second terminal connected to either end of a first direct current voltage source and second direct current voltage source connected in series;

a third terminal connected to the connection point of the first direct current voltage source and second direct current voltage source;

a first circuit having a first switch element and fourth switch element connected in series and a diode connected in inverse parallel to the first switch element and fourth switch element, wherein either end of the first switch element and fourth switch element connected in series is connected to the first terminal and second terminal, and the connection point of the first switch element and fourth switch element is an alternating current output terminal; and a second circuit in which a circuit in which a second switch element and diode are connected in series, and a circuit in which a third switch element and diode are connected in series, are connected in inverse parallel, one connection point connected in inverse parallel is connected to the third terminal, and the other connection point connected in inverse parallel is connected to the alternating current output terminal.

13. The power conversion device according to claim 8, wherein the gate signal selector, when it is possible to output the alternating current phase voltages by on-off controlling only the switch elements of either the first or second half bridge, outputs the output of the second PWM controller as the gate signals of the switch elements.

14. The power conversion device according to claim 8, wherein the direct current input voltage is evenly divided in series by a first direct current voltage source and second direct current voltage source, and the gate signal selector, when the voltage values of the first power source and second power source are larger than the amplitude value of the alternating current phase voltage command, outputs the output of the second PWM controller as the gate signals of the switch elements.

* * * * *